Figure 1:
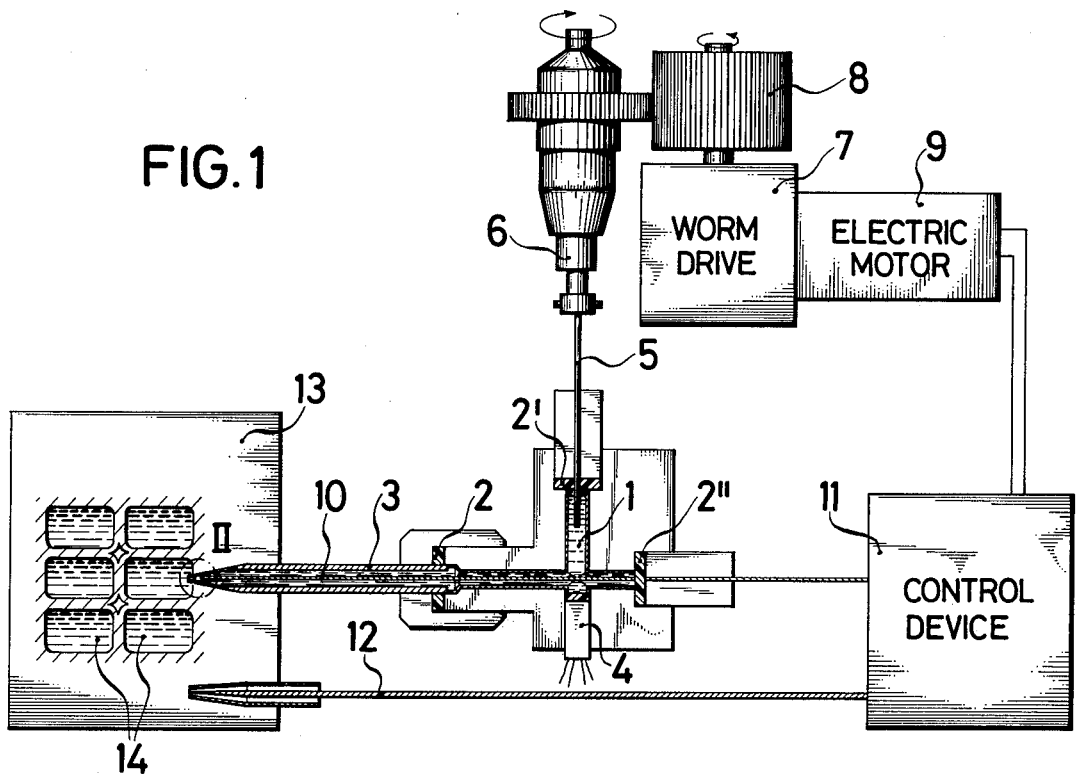

United States Patent [19]

Hüsken et al.

[11] 4,214,487
[45] Jul. 29, 1980

[54] APPARATUS FOR MEASURING THE PRESSURE IN A VERY SMALL VOLUME

[75] Inventors: Dieter Hüsken, Jülich; Ernst Steudle, Aachen; Ulrich Zimmerman, Jülich, all of Fed. Rep. of Germany

[73] Assignee: Kernforschungsanlage Jülich Gesellschaft mit beschränkter Haftung, Jülich, Fed. Rep. of Germany

[21] Appl. No.: 949,965

[22] Filed: Oct. 10, 1978

[30] Foreign Application Priority Data

Oct. 8, 1977 [DE] Fed. Rep. of Germany ....... 2745437

[51] Int. Cl.² .............................................. G01L 9/00
[52] U.S. Cl. ........................................ 73/753; 73/756
[58] Field of Search .......................... 73/700, 753, 756; 128/2 P, 2.05 D, 2.05 E

[56] References Cited

U.S. PATENT DOCUMENTS

| | | | |
|---|---|---|---|
| 2,535,998 | 12/1950 | Bierman | 128/2.05 D |
| 3,942,382 | 3/1976 | Hok | 128/2.05 D |

*Primary Examiner*—Donald O. Woodiel
*Attorney, Agent, or Firm*—Becker & Becker, Inc.

[57] ABSTRACT

An apparatus for measuring the pressure in a very small volume, such as a biological cell or a capillary vessel. The apparatus has a space or chamber which is connected with a microcapillary tube, is pressure-tight, and is filled with a nearly incompressible medium, such as silicone oil or the like. To measure the pressure in the space, a device for converting the pressure into electrical values is connected to the space. A body, which partially displaces the medium and is moved from outside the space, extends into the space. The apparatus includes a reference electrode and another electrode which is arranged within the microcapillary tube and extends nearly to the opening of the tube. The two electrodes are electrically connected to a control device which is connected with a drive for moving the body which is provided for partial displacement of the medium. The control device is designed in such a way that by insertion or withdrawal of the body into the space, it regulates the interface (located in the microcapillary tube during the measuring process) between the medium and the fluid which penetrates the capillary tube from the volume of the cell. The regulation by the control device is a function not only of the measured value of the electrical resistance between the two electrodes as input variable, but also of a predetermined rated resistance value.

3 Claims, 2 Drawing Figures

APPARATUS FOR MEASURING THE PRESSURE IN A VERY SMALL VOLUME

The present invention relates to an apparatus for measuring the pressure in a very small volume, such as a biological cell or a capillary vessel. The apparatus has a space or chamber which is connected with a microcapillary tube, is pressure-tight, and is filled with a nearly incompressible medium, such as silicone oil or the like. To measure the pressure in the space, a device for converting the pressure into electrical values is connected to the space. A body, which partially displaces the medium and is movable from outside the space, extends into the space.

A heretofore known device of this type serves to measure the pressure in single-celled algae. With this heretofore known apparatus, the measured pressure allows a reading of the volume flow which occurs between the vacuole of the algae and the outside medium as the result of a hydrostatic and/or osmotic pressure difference in the non-stationary state. However, with this heretofore known apparatus it is not possible to avoid those errors in measurement which are attributable to the effects, though small, of the compressibility of the medium or also to the effect of temperature fluctuations on the volumetric change of the medium. The known apparatus is therfore limited in its use to relatively large cells, such as single-cell algae.

It is therefore an object of the present invention to provide an apparatus of the above described general type, according to which the effect of the compressibility of the medium located in the pressure-tight area, as well as other limiting factors, is largely eliminated, thus achieving a high accuracy of measurement.

Figure 2:
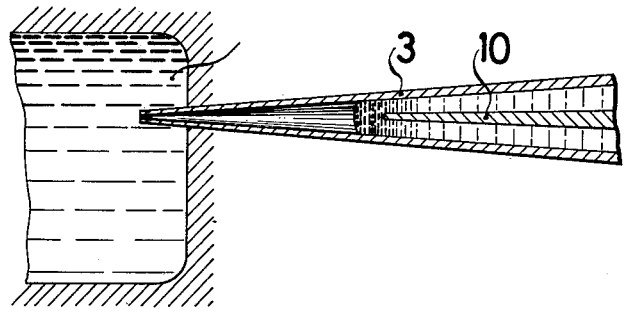

This object, and other objects and advantages of the present invention, will appear more clearly from the following specification in connection with the accompanying drawing, in which:

FIG. 1 schematically illustrates an apparatus according to the present invention with a piece of tissue, the pressure of which is to be measured and which is located in a fluid bath; and FIG. 2 is an enlargement of the encircled portion II of FIG. 1, showing the tip of the microcapillary tube piercing a cell.

The apparatus of the present invention is characterized primarily by a comparison or reference electrode, and another electrode which is arranged within the microcapillary tube and extends nearly to the opening of the microcapillary tube. The two electrodes are electrically connected to a control device which is connected with a drive for moving the body provided for partial displacement of the medium. The control device is designed in such a way that, by insertion or withdrawal of the body into the space, it regulates the interface (located in the microcapillary tube during the measuring process) between the medium and the fluid which penetrates the capillary tube from the volume of the cell. The regulation by the control device is a function not only of the measured value of the electrical resistance between the two electrodes as input variable, but also of a predetermined rated value of the resistance.

The apparatus according to the present invention can be designed in such a way that the reference electrode is arranged in the microcapillary tube together with, yet electrically insulated from, the other electrode. In this connection, both electrodes extend into the tip of the microcapillary tube to the same extent. However, the reference electrode can also be used outside of the microcapillary tube.

When employing the apparatus of the present invention to measure the pressure, for example the pressure in a biological cell, the microcapillary tube, the diameter of the tip of which is expediently 1 to 5 $\mu$m, is inserted into a cell which is part of a piece of tissue. After a relatively short time, from several seconds to several minutes, the point of insertion seals again. In the event that the reference electrode is not arranged in the microcapillary tube, it is immersed in the physiological solution in which the piece of tissue is found, so that the value of the electrical resistance between the two electrodes can be measured across the physiological solution. This resistance value depends on whether and to what extent the electrode located in the microcapillary tube is enveloped by the medium, for example silicone oil, located in the sealed space, the pressure measuring chamber. If a desired or rated value of the electrical resistance is predetermined, then by means of the control device, by displacement of the body which projects into the pressure measuring chamber, that position of the interface (silicone oil/cell fluid in the microcapillary tube) at which the value of the resistance between the electrodes conforms to the rated value is set.

Since by moving the interface (silicone oil/cell fluid) in the microcapillary tube in the direction toward the opening of the capillary tube the resistance value increases greatly, when the silicone oil just envelops the electrode arranged in the microcapillary tube, it is expedient that the rated value of the resistance have a value between the two electrodes. At this value, the tip of the electrode arranged in the microcapillary tube is just enveloped by the medium. As a result of the fact that the tip of the electrode is located close to the opening of the microcapillary tube, only a small quantity of cell fluid penetrates into the microcapillary tube, so that the volume that the cell fluid has after the microcapillary tube is introduced into the cells nearly corresponds to the original cell volume.

Since the position of the interface is kept constant by the control device during the measurement, those inaccuracies of the pressure measurement which are attributable to the compressibility of the silicone oil, as well as those due to temperature variations, are avoided. As a result, the apparatus of the present invention is also usable to measure the pressure in very small volumes of under 0.1 nl, for example plant or animal cells. The apparatus of the present invention is therefore usable in a much greater range of application than was possible with the heretofore known apparatus. Thus it is possible for the first time, in addition to the direct measurement of the hydrostatic pressure in biological cells, to also directly measure the cell wall elasticity and water permeability of individual biological cells. These measurements can be used, for example, to differentiate between healthy and unhealthy cells. Further medical uses of the apparatus of the present invention include, for example, a very exact measurement of pressure profiles in capillary vessels.

Referring now to the drawing in detail, the apparatus has a pressure-tight space, namely the pressure measuring chamber 1, with which, by means of a seal 2, a microcapillary tube 3 is connected. The pressure measuring chamber 1 is filled with silicone oil. A pressure converter 4, which serves to convert the pressure into electrical values, is connected to the pressure measuring chamber 1. The pressure converter 4 is also connected to an electrical indicator or display (not shown).

A metal rod 5 projects into the pressure measuring chamber 1 through a further seal 2'. The metal rod 5 is connected to a fine feed 6 which, by means of a worm drive 7 and a further interchangeable drive 8, is operable by an electric motor 9. As a result, a speed or gear ration of 2500:1 can be achieved.

As further shown in FIG. 1, an electrode 10 is located within the microcapillary tube 3. The electrode 10 is guided out of the pressure measuring chamber 1 through yet another seal 2" and is electrically connected with a control device 11. The electrode 10 comprises a thin silver wire having a diameter of about 1 μm. The tip of the electrode 10 is located close to the opening of the microcapillary tube 3. A comparison or reference electrode 12 is connected to the control device 11 and extends into the fluid 13 in which the cellular tissue 14 is located.

A device of the type shown in FIG. 1 was used to measure the hydrostatic pressure in cells of the plants Carpobrotus edolis and Capsicum annuum. The diameter of the cells of the former were about 30 μm, and of the latter were about 70 μm. As shown in the drawing, and especially in FIG. 2, the microcapillary tube 3 was introduced into a cell. After the point of insertion had healed, the interface (silicone oil/cell fluid) was adjusted to the position shown in FIG. 2 at the tip of the electrode 10. In order to measure the resistance, voltage pulses having a pulse level in the range of 20 to 50 mV and a duration of 50 to 100 ms, in time intervals of 100–400 ms, were used. The speed or gear ratio of the drive was selected in such a way that a feed of the metal rod of 1 μm/sec was achieved while the motor was running. The resistance values obtained were compared in the control device 11 with the predetermined rated value, and the thus obtained measured value was used to control the drive for the metal rod 5. Measurements were carried out for about 5 hours. In addition to the hydrostatic pressure, the elasticity of the cell walls and the water permeability of the cells were also continuously determined.

In place of a pulse operation of the control unit, it is naturally also possible to have a continuous operation with the use of alternating current.

The present invention is, of course, in no way restricted to the specific disclosure of the drawing, but also encompasses any modifications within the scope of the appended claims.

What is claimed is:

1. An apparatus for measuring the pressure in a very small volume, especially capillary vessels and biological cells, in a fluid, which apparatus comprises:
    a pressure-tight chamber fillable with a nearly incompressible medium;
    a microcapillary tube for penetrating said volume, both ends of said tube being open, one end communicating with said chamber;
    a device communicating with said chamber for converting pressure therein to electrical values;
    means extending into said chamber and movable for partially displacing medium therein;
    a first electrode arranged within said microcapillary tube and having a tip end extending nearly to the other open end of said tube;
    a second electrode in the form of a reference electrode;
    a control device electrically connected to both of said electrodes for regulating an interface, located in said microcapillary tube during measurement, between said medium and fluid penetrating said tube from said volume, said control device effecting said regulation of the interface by moving said medium-displacing means within said chamber as a function of electrical resistance between said electrodes and a predetermined rated resistance value; and
    means operatively connected to said control device for effecting said movement of said medium-displacing means.

2. An apparatus according to claim 1, in which said incompressible medium is silicone oil.

3. An apparatus according to claim 1, in which said rated resistance value is between the resistance values of said two electrodes and is that value at which said tip end of said first electrode is just enveloped by medium.

* * * * *